US009529987B2

(12) United States Patent
Deutschmann et al.

(10) Patent No.: US 9,529,987 B2
(45) Date of Patent: Dec. 27, 2016

(54) BEHAVIORAL AUTHENTICATION SYSTEM USING A BEHAVIOR SERVER FOR AUTHENTICATION OF MULTIPLE USERS BASED ON THEIR BEHAVIOR

(71) Applicant: Behaviometrics AB, Lulea (SE)

(72) Inventors: Ingo Deutschmann, Merseburg (DE); Neil Costigan, Lulea (SE); Tony Libell, Lulea (SE); Peder Nordström, Lulea (SE)

(73) Assignee: BEHAVIOMETRICS AB, Lulea (SE)

( * ) Notice: Subject to any disclaimer, the term of this patent is extended or adjusted under 35 U.S.C. 154(b) by 89 days.

(21) Appl. No.: 14/705,478

(22) Filed: May 6, 2015

(65) Prior Publication Data

US 2015/0324563 A1    Nov. 12, 2015

Related U.S. Application Data

(60) Provisional application No. 61/990,727, filed on May 9, 2014.

(51) Int. Cl.
*G06F 21/30* (2013.01)
*G06F 21/31* (2013.01)
*H04L 29/08* (2006.01)
*H04L 29/06* (2006.01)
*H04W 12/08* (2009.01)

(52) U.S. Cl.
CPC ............ *G06F 21/31* (2013.01); *G06F 21/316* (2013.01); *H04L 29/06* (2013.01); *H04L 29/08* (2013.01); *H04L 63/08* (2013.01); *H04L 63/083* (2013.01); *H04L 63/10* (2013.01); *H04L 63/102* (2013.01); *H04L 67/22* (2013.01); *H04L 67/306* (2013.01); *H04W 12/08* (2013.01)

(58) Field of Classification Search
USPC ..................................................... 726/7, 19
See application file for complete search history.

(56) References Cited

U.S. PATENT DOCUMENTS 7,908,216 B1 *   3/2011   Davis ..................... G06Q 20/02
                                                   705/41
2003/0088645 A1 * 5/2003  Ferraro ................. G06Q 10/10
                                                   709/218
2003/0179912 A1 * 9/2003  Murase .............. G06K 9/00154
                                                   382/119

(Continued)

*Primary Examiner* — Sayed Beheshti Shirazi
(74) *Attorney, Agent, or Firm* — Michael J. Feigin, Esq.; Feigin & Fridman

(57) ABSTRACT

A method and a corresponding device for authenticating a user for access to protected information, the method comprising generating a behavioral user profile associated with a first user known to be a legitimate user of the protected information, obtaining from a second user, using a behavioral input device associated with a second computing device, a behavioral user sample, storing the behavioral user sample, associated with the second user, in a temporary user profile, comparing the behavioral user sample of the second user to the behavioral user profile, and if the behavioral user sample does not match the behavioral user profile contacting the legitimate first user and receiving from the legitimate first user information regarding the legitimacy of the second user and based on the information received from the first user, providing a response to the second user and updating the user profile.

8 Claims, 7 Drawing Sheets

(56) References Cited

U.S. PATENT DOCUMENTS

| | | | | |
|---|---|---|---|---|
| 2004/0131237 A1* | 7/2004 | Machida | ............ | G06K 9/00899 382/124 |
| 2008/0091453 A1* | 4/2008 | Meehan | ............... | G06Q 20/341 705/317 |
| 2008/0129704 A1* | 6/2008 | Pryor | ...................... | G06F 3/011 345/173 |
| 2009/0278792 A1* | 11/2009 | Toebes | .................... | G06F 21/32 345/156 |
| 2010/0115610 A1* | 5/2010 | Tredoux | ................ | H04L 9/3231 726/19 |
| 2010/0272609 A1* | 10/2010 | Haas | .................. | G01N 21/8483 422/82.05 |
| 2011/0304531 A1* | 12/2011 | Brooks | ................. | G06F 1/1626 345/156 |
| 2012/0246737 A1* | 9/2012 | Paxton | ................. | G06F 21/316 726/27 |
| 2012/0266220 A1* | 10/2012 | Brudnicki | ............. | G06F 21/629 726/6 |
| 2013/0076650 A1* | 3/2013 | Vik | ......................... | G06F 3/041 345/173 |
| 2013/0282637 A1* | 10/2013 | Costigan | ................ | G06N 5/022 706/46 |
| 2013/0288647 A1* | 10/2013 | Turgeman | ............. | H04W 12/06 455/411 |
| 2014/0247251 A1* | 9/2014 | Zhang | ................. | G06F 3/0488 345/178 |
| 2014/0297528 A1* | 10/2014 | Agrawal | ................. | G06F 21/32 705/44 |
| 2016/0197918 A1* | 7/2016 | Turgeman | ............. | G06F 3/0481 726/4 |

\* cited by examiner

100

BEHAVIORAL AUTHENTICATION SYSTEM USING A BEHAVIOR SERVER FOR AUTHENTICATION OF MULTIPLE USERS BASED ON THEIR BEHAVIOR

FIELD OF THE DISCLOSED TECHNOLOGY

The disclosed invention relates generally to a behavioral authentication system, a behavioral authentication method and a behavioral authentication software program. More particularly the disclosed invention relates to a system, a method and a software program for authenticating multiple users based on their behavior.

BACKGROUND OF THE DISCLOSED TECHNOLOGY

Desktop computers, mobile devices and tablet computers have no built-in security mechanisms for user authentication with web services and applications, other than the traditional Personal Identification Number (PIN) or use of additional devices like smart cards or One-Time Password (OTP) tokens. However, web services and applications for banking access rely on a strong user authentication to protect customer data and funds against unauthorized access. For authentication of users to be non-annoying and not disrupting, a behavioral authentication which is transparent to the user is seen as a favorite method.

As behavioral methods are built to discriminate users based on their behavior, they have a hard time coping with shared accounts which are used by two users having different behaviors, such as, for example, account sharing for banking accounts (spouse account). These kinds of accounts are wide spread, typically as family accounts as well as in small companies, causing the problem to arise in many settings.

There are several patent applications and issued patents in the field of user authentication which use biometric methods to identify users on mobile devices and other computing devices. In U.S. Patent Publication No. 2010/0225443, a system is described for user authentication using touch sensitive elements and/or using a signature of the user. In U.S. Patent Publication No. 2011/0126024, a method and system are described for combining a PIN and a biometric sample. In U.S. Pat. No. 8,443,443, a behavioral system is described for authenticating users, based on keyboard, mouse and Graphical User Interface (GUI) actions.

In behavioral systems, there is typically an enrollment phase and an authentication phase. In the enrollment phase behavioral data of the user is gathered on the client computing device and transferred to a behavioral authentication system, which server generates a behavioral profile for the user and stores the profile in a database.

In the authentication phase, behavioral data of the user is gathered on the client computing device and is sent to the behavioral authentication system, which compares the received behavioral data with the behavioral profile associated with the user. If the behavioral data of the user is similar to the behavioral data, stored in the associated behavioral profile, the user is granted access to the protected application or the protected resource. The problem with this solution is that there is no possibility of adding multiple users to the same profile, as different users shows different behaviors.

Many software applications, such as for example banking applications, provide for a joint account, often termed a "spouse account", where two or more individuals share an account and are both authorized to access the shared account. In real environments, like banking applications or access control systems for sensitive information, many times multiple users access the protected information or application using the same username or user access data, such as a customer number and a user specific PIN. In banking applications, these might be the owner of the account and his spouse, or multiple employees in a company, where several people are allowed to manage a banking account while using the same customer number. As such, the users cannot be distinguished by their customer number. Because typically a single profile is built for each customer number, the behavioral profile associated with the customer number must consist of stored behavioral data of several people, which is not possible using the solutions described above. Thus, there is need in the art for more effective systems and methods for authenticating several users using a single account based on behavioral information.

SUMMARY OF THE DISCLOSED TECHNOLOGY

Therefore, it is an object of the disclosed technology to provide a method for authenticating multiple users and using the user credential information of the authenticated users to access protected information, based on monitoring and gathering behavior of the multiple users, storing behavioral information of the multiple users associated with the authentication information to determine security clearance during future uses of the protected information. There is provided a method for gathering behavioral data of multiple users, addition of the gathered behavioral data to a biometric and/or behavioral profile, as well as storage and authentication of the users together with the business process needed to authenticate these users.

There is thus provided, in accordance with an embodiment of the disclosed technology a method for authenticating a user for access to protected information using at least one computing device, the method comprising:

using at least one behavioral input device associated with a first computing device, generating a behavioral user profile associated with a first user known to be a legitimate user of the protected information;

storing the generated behavioral user profile of the first user in a database;

when authenticating a second user, obtaining from the second user, using a behavioral input device associated with a second computing device used by the second user, a behavioral user sample;

storing the behavioral user sample, associated with the second user, in a temporary user profile;

at a behavioral server, comparing the behavioral user sample of the second user to the behavioral user profile associated with at least one of the protected information, the second computing device, and the legitimate user;

if the behavioral user sample matches the behavioral user profile, identifying the second user as the legitimate first user, enabling the second user to access the protected information, and updating the behavioral user profile associated with the first user with data of the behavioral data sample; and if the behavioral user sample does not match the behavioral user profile:
  contacting the legitimate first user and receiving from the legitimate first user information regarding the legitimacy of the second user; and based on the information received from the first user, providing a response to the second user and updating the user profile.

In some embodiments, if the information received from the first user confirms legitimacy of the second user, the providing a response comprises:

enabling the second user to access the protected information;

updating the behavioral user profile associated with the first user to include data of the behavioral data sample; and flagging the behavioral user profile as a multi-user profile.

In some embodiments, if the information received from the first user denies legitimacy of the second user, the providing a response comprises:

blocking access of the second user to the protected information; and storing the data of the behavioral data sample as behavioral data corresponding to a fraudulent user.

In some embodiments, the behavioral user profile and the behavioral user sample comprise at least one of:

characteristics of tactile interaction with a touchpad;

orientation of a device for collecting the behavioral user profile and the behavioral user sample, during use thereof by the user, as sensed by at least one of a gyroscope and an accelerometer;

characteristics of tactile interaction with a fingerprint scanner;

at least one keystroke pattern;

at least one sequence of application use;

characteristics of times of use as sensed by a clock;

characteristics of locations of use as sensed by at least one positioning system; and characteristics of network connectivity during use.

In some embodiments, the first user and the second user are the same user, and the first computing device is different from the second computing device. In other embodiments, the first user is different from the second user, and the first computing device is the same as the second computing device.

There is further provided, in accordance with another embodiment of the disclosed technology a device for authenticating an unknown user for access to protected information based on a behavioral user profile of a known legitimate user having access to the protected information, the device comprising:

at least one behavioral input device obtaining a behavioral data sample from the unknown user;

a database;

at least one communication module; and a processor, functionally associated with the behavioral input device, the communication module, and the database, the processor:

obtaining from the behavioral input device the behavioral data sample of the unknown user and generating therefrom a temporary behavioral user profile;

transmitting the temporary behavioral user profile to an authentication server or behavioral server for authentication thereof;

receiving from the authentication server or behavioral server a result of a comparison of the behavioral data sample of the unknown user to the behavioral user profile of the known legitimate user;

if the result is indicative of a match between the behavioral data sample of the unknown user and the user profile, identifying the unknown user as the legitimate known user, enabling the unknown user to access the protected information, and updating the behavioral user profile associated with the legitimate known user with data of the behavioral data sample; and if the result is indicative of the behavioral data sample not matching the behavioral user profile:

using the at least one communication module, contacting the known user and receiving from the known user information regarding the legitimacy of the unknown user; and based on the information received from the known user, providing a response to the unknown user and updating the user profile.

In some embodiments, if the information received from the known user confirms legitimacy of the unknown user, the processor further:

enabling the unknown user to access the protected information;

updating the behavioral user profile associated with the known user in the database to include data of the behavioral data sample; and flagging the user profile as a multi-user profile.

In some embodiments, if the information received from the known user denies legitimacy of the unknown user, the processor further:

blocking access of the unknown user to the protected information; and storing the data of the behavioral data sample in the database as behavioral data corresponding to a fraudulent user.

In some embodiments, the database is located in a network node remote to the processor, and the at least one communication module is configured for retrieving the behavioral user profile from the database and for communicating updates to the behavioral user profile to the database.

In some embodiments, the behavioral input device comprises at least one of:

a touchpad providing, as the behavioral data sample, information regarding use characteristics of tactile interaction therewith;

at least one of a gyroscope and an accelerometer providing, as the behavioral data sample, information regarding orientation of the device during use thereof by the user;

a keystroke sensor providing, as the behavioral data sample, information regarding at least one keystroke pattern;

the processor providing, as the behavioral data sample, information regarding at least one sequence of application use;

a clock providing, as the behavioral data sample, information regarding characteristic times of use of the device or of at least one software application running thereon;

a positioning device providing, as the behavioral data sample, information regarding characteristic locations of use of the device; and at least one network connection providing, as the behavioral data sample, information regarding characteristic network connectivity during use of the device.

In accordance with some aspects of the disclosed technology and according to an embodiment thereof, there is a further provided a method for determining whether data in a user profile is associated with multiple users, the method comprising:

using at least one behavioral input device, collecting a plurality of behavioral user samples for a plurality of behavioral modalities during a corresponding plurality of user sessions;

generating a user profile including the behavioral user samples of the plurality of user sessions;

clustering the collected behavioral user samples of each of the behavioral modalities into focused clusters;

based on the clustering, identifying whether the plurality of user sessions were created by a single user or by multiple users; and if the identifying is indicative of the plurality of user sessions being created by multiple users, flagging the user profile as a multi-user profile.

In some embodiments, the identifying comprises computing a pairwise distance between each pair of the plurality of user sessions, and if the pairwise distance between a specific pair of the plurality of user sessions is greater than a predetermined threshold distance, identifying that each user session in the specific pair of user sessions is created by a different user.

In some embodiments, the computing a pairwise distance for a specific pair of user sessions of the plurality of user session comprises counting a number of ones of the plurality of behavioral modalities in which the behavioral data samples corresponding to the specific pair of user sessions have a different value.

In some embodiments, the identifying comprises for at least two of the plurality of modalities, identifying whether the clustering has resulted in more than one cluster, and if a number of the plurality of modalities for which the number of clusters is greater than one is greater than a predetermined modality threshold, identifying the different clusters as corresponding to sessions being generated by different users.

"Behavioral input data," for purposes of this specification, is defined as data observed and/or recorded during user interaction with the user input component(s) of one or more computing devices. Such data may include the manner in which the user holds and orients the mobile device. The data may further include electronic input observations such as keystroke patterns and style, usage of particular applications, and speech recognition. The data may further include a locations at which the computing device is used as determined by a positioning system such as a Global Positioning System (GPS), an orientation of the computing device during user thereof as determined by an accelerometer and/or a gyroscope, and data obtained by use of a touch screen of a mobile computing device.

"A modality," for the purposes of this specification, is defined as a single specific type of behavioral input data. Thus, different modalities are defined as different types of behavioral input data.

A "protected service" for purposes of this specification is any website or service accessible via a network or located on a user's computing device, which requires special security clearance of the user in order to allow the user's access. This might be a banking site or banking application, as well as a sales system or any other service, requiring a user to authenticate.

A "behavioral server," for purposes of this specification, is defined as a local or a remotely accessible server having a processor for executing instructions stored on a non-transitory storage medium. The behavioral server is configured to analyze behavioral input data and compare it with a database of recognizable behavioral profiles associated with a plurality of known users for at least one computing device. The behavioral server may have a database associated therewith for storing user profile data, prior usage data, and/or behavioral data regarding a plurality of users and devices. The database may be stored on, or may remotely accessible by, the behavioral server, and may be continuously updated, pursuant to incoming behavioral data. That is, users' habits and patterns of use with regard to a computing device may change over time. Prior usage data and profile information, therefore, may be continuously updated to reflect these changes, in order to make accurate future determinations.

A "behavior monitor," for purposes of this specification, is defined as any sequence or steps or algorithm stored on a non-transitory storage medium and carried out by a processor of a mobile device. The behavior monitor may be a software program (defined as, "lines of compiled code which are executable on a processor") installed or written onto the storage of the mobile device. The behavior monitor may run as a background process on the mobile device. A user may or may not be aware of the behavior monitor's presence on the mobile device. Alternatively, the behavior monitor may be stored remotely, at a node or a server that is accessible via the mobile device through a network connection.

"User credential input", "user credential information", "authentication input" and "authentication information," for purposes of this specification, are all defined as any action taken on the computing device that involves an exchange of sensitive information or currency. Sensitive information may be any information deemed to be considered secure or private to an individual. Such sensitive information may include user identification information, PIN's, social security numbers, addresses, passport information, banking information, credit card information, medical information, etc. The "user credential input" may also include access to credit card information, banking information, or other online payment information, for purposes of executing an exchange of currency, such as, for example, a purchase from an online merchant.

A "session," for purposes of this specification, is defined as an interval of use of the computing device involving access to sensitive information by a single user. The start of a session may be when the sensitive information is initially accessed. The session may be terminated by the user logging out from access to the sensitive information or a location thereof, by timeouts triggered by accessed sensitive information location, or by timeouts triggered by the computing device.

It should be understood that the use of "and/or" is defined inclusively such that the term "a and/or b" should be read to include the sets: "a and b," "a or b," "a," "b." Further details are set forth in the detailed description below.

Figure 1:
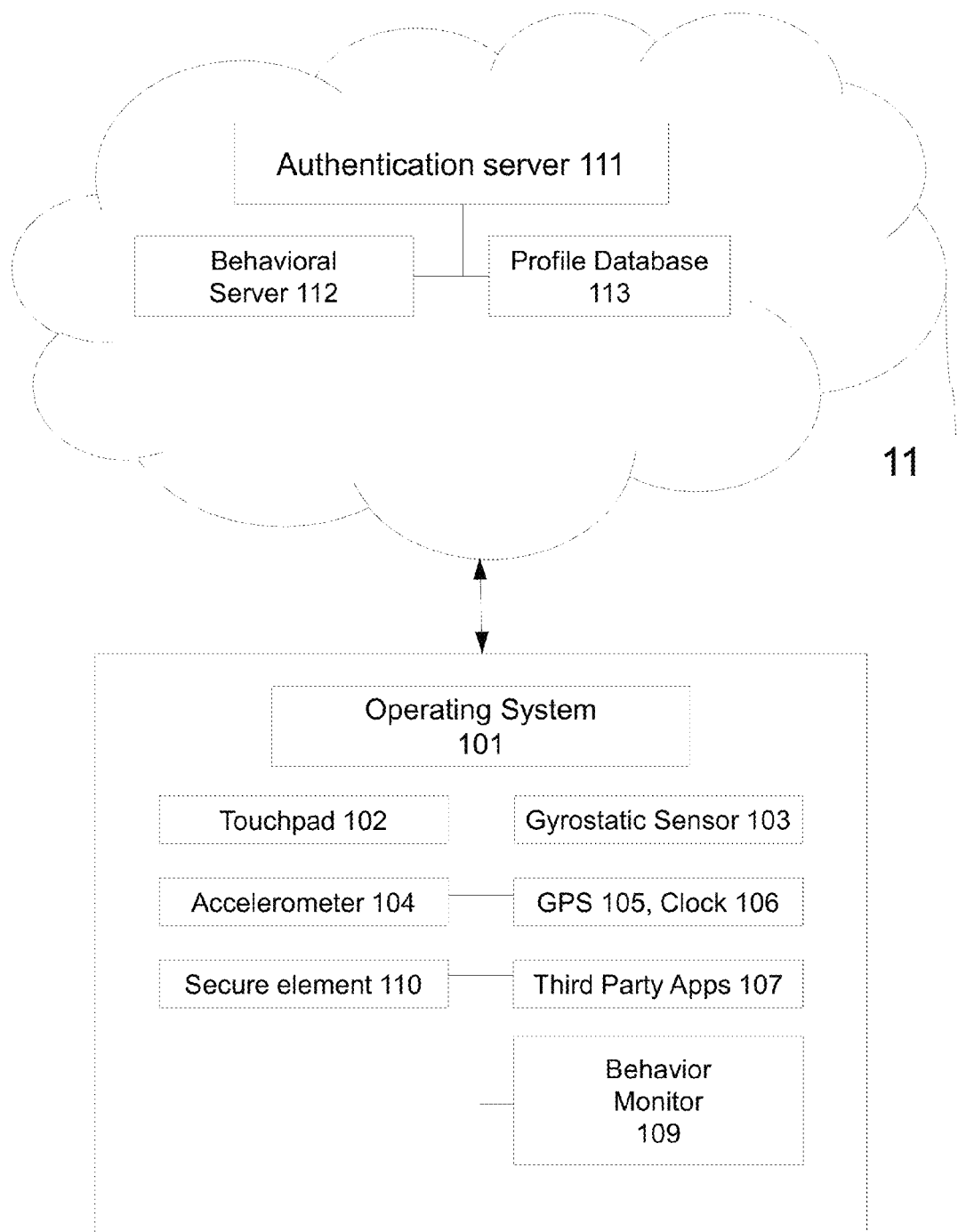
FIG. 1 shows a schematic overview of an exemplary system for authentication of multiple users according to an embodiment of the disclosed technology.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed technology are directed to a behavioral authentication system comprising a client computing device, which might be a mobile computing device, optionally with a fingerprint reader. Examples of mobile computing devices include, but are not limited to, mobile phones, tablet computers, personal digital assistants (PDAs), laptop computers, netbooks, smart watches, e-readers, and/ or digital cameras.

In accordance with an embodiment of the disclosed technology, there is provided a method for authenticating multiple users for access to protected information using the same user credential input, the method comprising, not necessarily in the following order:

a) a first user logging into a protected service using authentication information in a first session;
b) while the first user is logged into the protected service, gathering behavioral input data from at least one user input component of a computing device used by the first user;
c) uploading a version of at least a portion of the gathered behavioral input data to a behavioral server via a network connection;
d) storing the uploaded version of the behavioral input data in a user profile of the behavioral server in conjunction with the authentication information or in conjunction with the account of the protected service;
e) during a subsequent session of access to the protected service, retrieving the behavioral input data stored in the behavioral server from the behavioral server;
f) determining if behavioral input data gathered during the subsequent session of use of the computing device matches behavioral input data stored in the behavioral server and collected during the first session; and
g) generating a response for the first user based on the determination, wherein the response is an authentication of the first user or a rejection of privileged access sought by the first user by way of the user credential input;
h) a second user logging into the protected service using the authentication information used by the first user;
i) while the second user is logged into the protected service, gathering additional behavioral input data from at least one user input component of the computing device used by the second user;
j) uploading a version of at least a portion of the gathered additional behavioral input data to the behavioral server via the network connection;
k) storing the additional behavioral input data in a temporary user profile of the behavioral server in conjunction with the authentication information or in conjunction with the account of the protected service;
l) during a subsequent session of access to the protected service by the second user, retrieving behavioral data from the behavioral server stored in conjunction with the authentication information;
m) determining if behavioral input data entered during the current session of use of the computing device matches behavioral data collected during prior use thereof;
n) generating a response based on the determination, wherein the response is an authentication or a rejection of privileged access sought by the second user by way of the user authentication input;
o) if the response is an authentication, adding the additional behavioral data included in the temporary user profile to the user profile of the behavioral server;
p) if the response is a rejection, using an out of band method to contact a legitimate user of the protected service; and
q) if the legal user of the protected service confirms that the gathered additional behavioral input data is from a rightful user of the protected service, adding the additional behavioral input data included in the temporary user profile to the user profile of the behavioral server and flagging the user profile as a multi user profile.

In some embodiments, the first user is a legitimate user or the legitimate user of the protected services. In some embodiments, the first and second users have different computing devices associated therewith and used thereby to access the protected service. In other embodiments, the first and second users use the same computing device to access the protected service.

In some embodiments, the out of band method by which the legitimate user might be an additional verification of security questions, which only the legal user would be able to answer, such as: "What is your mother's maiden name?" or said user might be asked to provide additional information, which might lead to secure authentication of the second user.

In some embodiments, the authentication information and the rejection information are shared with other applications connected via network lines.

In some embodiments, the behavioral input data may be encrypted and/or digitally signed before it is communicated to the behavioral server. Still further, the method may further include continuously monitoring use of the computing device for patterns that are indicative of fraud being perpetrated on the computing device. In some embodiments, the behavioral data may be gathered using behavior monitoring software installed on the computing device.

In some embodiments, the second user is the same as the first user, using a different computing device than used previously for collecting the behavioral input data forming the user profile. Since both devices were at least at one time in communication with the behavioral server, the user may be recognized to be using either device. However, in this scenario, access to user authentication information may require a greater degree of security or clearance. That is, the step of determining a match may require a greater degree of overlap between the behavioral input data and the prior usage data.

In additional embodiments, the method may further comprise sharing the authentication information with a third party application on, or in communication with, the computing device. The authentication information may grant access to a feature of the third party application.

In some embodiments, the step of gathering behavioral data may be carried out using a behavior monitor installed onto the computing device. Alternatively, the behavior monitor may be incorporated into an operating system of the computing device.

In some embodiments, the following process, shown herein in pseudo code, is executed step by step via a software program to distinguish between three types of users—the legitimate user, a spouse or other allowed user, and a non-authorized, or fraudulent, user—when accessing an account associated with a secure service or including secure content:

- initially, the user profile associated with the account is empty;
- User A, who is the legitimate user of the account, logs into the account and/or the protected service;
- The behavior of user A is gathered and sent to the behavioral server;
- The user profile for user A, associated with the account, is created using the behavior of user A;
- User A logs out;
- The user profile is now created;
- In a subsequent session of user A, the behavior of the user A is gathered and sent to the server;
- If the behavior of user A matches the behavior stored in the user profile on the behavioral server, authentication information is issued; and
- If the behavior of user A does not match the stored behavior on the behavioral server, rejection information is issued.

After some time a suspicion that a user B is seeking access to the account and/or to the protected service:

- User B logs in;
- The behavior of user B is gathered and sent to the behavioral server;
- The behavior of user B is stored in a temporary profile B associated with the account;
- The behavior of user B is compared with the stored behavior in the user profile associated with the account, which is based on the behavior of user A;
- If the stored behavior is not similar to, or does not match, the gathered behavior of user B, the authentication is deemed as failed;
- Any transactions that user B might have entered into the protected service, are not committed, but rather are put on hold until the legitimacy of user B is confirmed by the legitimate user of the account;
- The legitimate user of the account and/or the protected service is contacted using an out-of-band communication method;
- If the legitimate user confirms the legitimacy of the transaction or of user B using the account and/or protected service, the transaction is executed and the gathered behavior of user B, previously stored in the temporary profile B, is added to the user profile associated with the account.
- In this case, when the legitimate user of the protected service confirms that user B is another legitimate user of the protected service, the user profile is flagged as a "Multi User Profile";
- If the legitimate user does not confirm the legitimacy of the transaction, the transaction is aborted and the gathered behavior of user B is stored as fraudulent behavior in a specific fraudulent user profile.

In some embodiments, the behavior of user B is stored in a sub profile of the profile of user A. In other embodiments, behaviors of user A and user B are stored in separate sub profiles of a general user profile. In still other embodiments, the behaviors of user A and user B are each stored in one common profile of the user profile.

As the behaviors of two different users typically will be different, the combined user profile, containing the stored behaviors of user A and of user B will be "wider", or less specific, so an authentication of users will be not as accurate as when using sub profiles for each user. This can be used for protected services, not requiring a high degree of accuracy of user authentication.

In some embodiments, the following software program (in C code) processes how a profile is extended to include another user. Each timing is represented with an average and variance and updates online:

```
// Variables average, amount, variance are declared globally
public void add(double value, int max)
{
double m,v,n;
m=average;
n=(double)amount;
v=variance;
if(n >= max)
{
// If we have hit the limit we decrease with 1
n=(double)(max-1);
amount=max-1;
}
// update the mean
m = (m*n + value) / (n+1);
if(n==0)
{
v=0;
}
else
{
// update the variance
v= ((n - 1)*v + (value - m)*(value - average))/(n);
}
amount++;
average=m;
variance=v;
}
```

Deviation is the square root of the variance.
Let a legitimate user normally have an average A around 200, a standard deviation S around 20 and an amount N of 1.
// enrolment of user 1
// Initially its empty
A: 0.0 S: 0.0 N: 0
// then 200 is added to A
A: 200.0 S: 0.0 N: 1
// then 180 is added to A
A: 190.0 S: 14.1 N: 2
// then 220 is added to A
A: 200.0 S: 20.0 N: 3
// Now the amount is reset (by inputting N=2 as max into the function) and the new user which normally has an A around 300 is added
// Now the profile includes and can match both of the users.
A: 250.0 S: 70.7 N: 2

In some embodiments, the software program can be used to validate profiles of users, to distinguish, if a profile is including the stored behavior of multiple users or of a single user by comparing average, deviation and/or variance values of the profile with statistical values of other profiles, which are known to include multiple profiles or a single profile.

FIG. 1 shows a schematic overview of an exemplary system for authentication of multiple users according to an embodiment of the disclosed technology. The system includes a computing device 100, having connection to at least one wireless packet-switched network 11, as well as one or more sensors as described hereinbelow. The computing device 100 may be a mobile computing device, defined as any portable electronic device with a processor that carries out instructions, and having at least one wireless packet-switched network connection, an input for user interaction, and a visible display with which a user may interact. Examples of mobile computing devices 100 may be, but are not limited to, mobile phones, tablets, personal digital assistants (PDAs), laptops, netbooks, smart watches, e-readers, and/or digital cameras. The computing device 100 may be a desktop computer, defined as any traditional stationary or portable electronic device with a processor that carries out instructions, and having at least a network connection, an input for user interaction, and a visible display with which a user may interact.

Referring still to FIG. 1, the components of a mobile computing device 100 are shown. All of the components of the mobile computing device 100 are tied to an operating system 101, which is defined as coded instructions configured to instruct a hardware device to carry out mathematical operations or electrical interactions with physical components electrically or wirelessly connected to one another, as well as user interaction therewith. Examples of operating systems may include iOS, Android, BlackBerry OS and Microsoft operating systems.

Physical components of device 100 include one or more of a touchpad 102, a gyrostatic sensor 103, an accelerometer 104, and a GPS 105. Each of these physical components may typically already be found in most mobile computing devices 100.

When employed by the present invention, the physical components are used to detect and monitor movements or activities carried out by the user with respect to the device 100. Such movements may include, for example, an orientation and/or angle at which a user holds a mobile device 100 during operation thereof. For example, a particular user may typically hold the mobile device 100 at a horizontal, landscape orientation, with the display tilted at a 45 degree angle with respect to the ground. Such behavior, if consistently exhibited, may be stored and associated with a user profile pertaining to the particular user as explained hereinbelow, and may be used to authenticate a user to grant security clearance as described hereinbelow.

Other components of the mobile device 100, which may be monitored, include a clock 106 and/or third party applications 107. Times during which a particular user carries out particular functions may be indicative and dispositive that the particular user should be granted security clearance. For example, if a particular user opens a news application every morning around 7:30 AM, such behavior may be stored as part of the user's profile and may be considered a recognizable pattern indicative of the particular user of the device 100.

Additional components may be included in the device 100 for purposes of monitoring, recording, and/or sending behavioral data. One such component is a behavior monitor 109. The behavior monitor 109 may be incorporated into software that is installed onto the device 100. Alternatively, the behavior monitor 109 may be incorporated into the operating system 101. The behavior monitor 109 uses network connection 11 of the device 100 to send behavioral data to and receive behavioral data from a suitable server or remote location. The behavior monitor 109 may run in the background, and collect all available behavioral data.

The behavior of the user might be also gathered by including specific software into Third Party Applications 107 which allow gathering of information regarding user behavior.

In some embodiments, the behavior monitor 109 runs continuously, so that the system might provide a constant data feed. The behavior monitor 109 may use a secure element 110 for encryption, decryption, digital signing, and/or signature checking operations. The behavior monitor 109 is operable to use all available network capabilities of device 100 such as Global System for Mobile Communications (GSM), Bluetooth, Near Field Communication (NFC), etc., to send collected behavioral data to an authentication server 111, and is capable of receiving data from the authentication server 111. The behavioral data may be formatted using Extensible Markup Language (XML), JavaScript Object Notation (JSON) or other suitable structured data format. User information and optional reference information about the used cryptographic keys may also be formatted using XML, JSON or other suitable structured data format.

The behavior monitor 109 may also be in communication with a behavioral server 112, by which behavioral data may be analyzed and cross-referenced to a profile database 113. The profile database 113 may also be accessed remotely via network communication, and may contain personalized behavioral data for different users. The behavioral server 112 as well as the database 113 might reside on the device 100, or might be accessed remotely as shown in FIG. 1.

The behavior monitor 109 is operable to interpret behavioral input by monitoring system events of the operating system 101. In order to be independent of user actions like installing software or deleting software, the behavior monitor 109 may be realized as a system service or included into the source code of the operating system 101.

The behavioral input data may be preprocessed locally by the behavior monitor 109, using appropriate filters and templates for particular behaviors. This may be carried out, for example, by decreasing the granularity of the available data sources such as the gyrostatic sensor 103 and the accelerometer 104. User touches or pressure values might be filtered to better distinguish the user behavior. Furthermore statistical data about the behavior of the user may also be gathered while the user is using the device 100.

The behavioral input data may be filtered by omitting outlier data from the behavior, or by using statistical or weighted methods, to gather data better suited for further processing. The behavioral data that is analyzed may include touch gestures, keyboard actions (dwell, flight time), and movements of the device as determined based on data captured from the gyrostatic sensor 103, the accelerometer 104, and GPS 105.

The secure element 110, which may be included on the device 100, may be used for confirming or rejecting an identity of a user. The secure element 110 might be a simple Subscriber Identity Module (SIM) Universal Integrated Circuit Card (UICC), Trusted Platform Module (TPM), NFC module or another smart card or device that is capable of storing a secret key or a private/public key pair and is able to perform cryptographic operations therewith.

The secure element 110 might be included in the device 100 or may be otherwise connected to it, such that it may be accessible via an application installed on the device 100. This may be carried out using several wire-bound or wireless protocols, including, but not limited to, Universal Serial Bus (USB), Bluetooth, NFC, Radio-Frequency Identification (RFID) or other suitable protocols. The secure element 110 may also comprise a secured application capable of holding a secret or private/public key pair and able to carry out cryptographic operations therewith, a combination of an application with a protected storage, or an application using a cryptographic co-processor.

The secure element 110 may contain a symmetric key or an asymmetric key pair, and a server key. Cryptographic keys may be included in the secure element 110 at production time of the secure element. Cryptographic keys may be included via a bootstrap process and may later be updated using secure means. The cryptographic keys might also be generated in the secure element 110 and authenticated, using traditional Public-Key Infrastructure (PKI) means like signed Public-Key Cryptography Standard #10 (PKCS10) and certificates.

Figure 2:
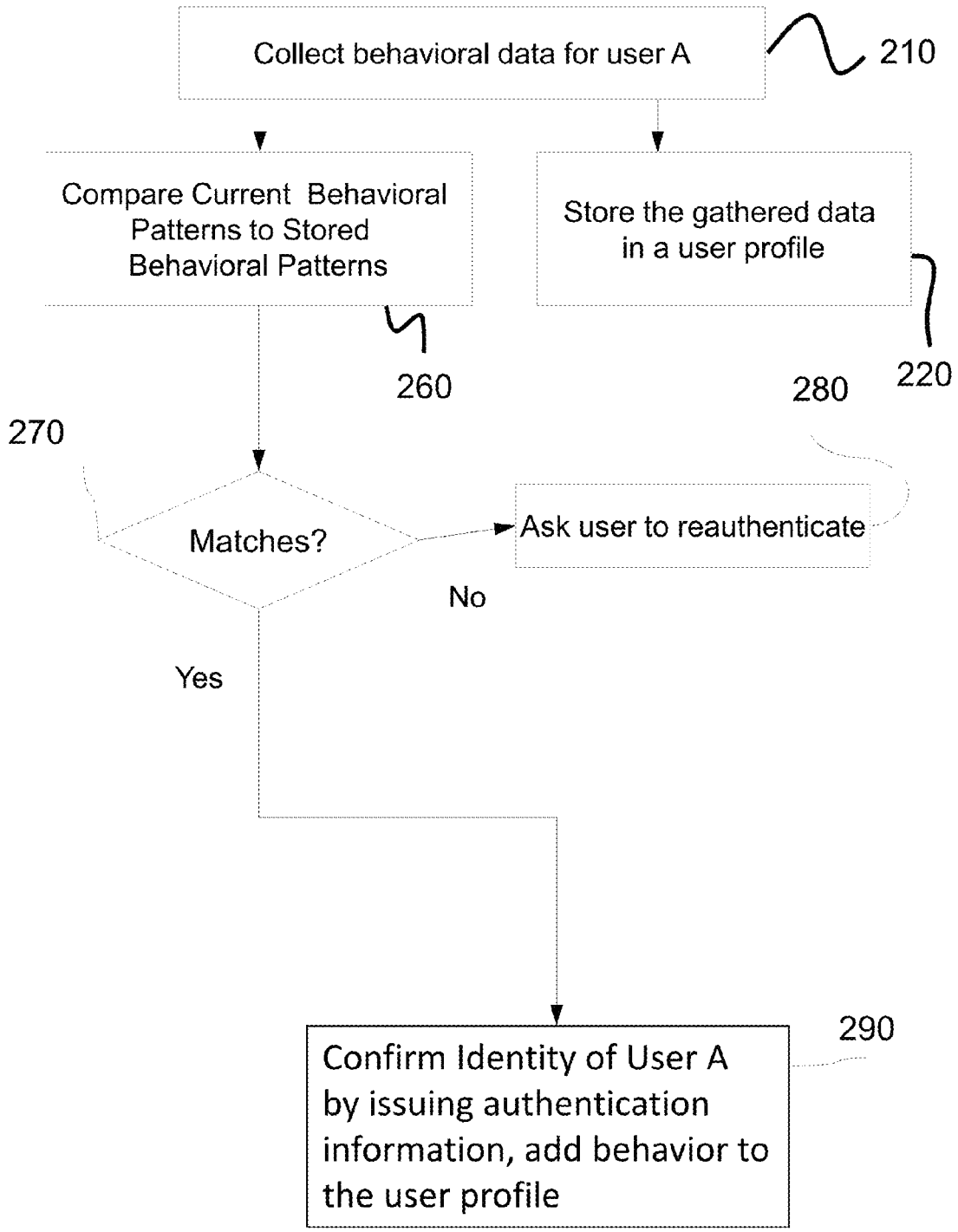
FIG. 2 shows a flow chart of steps taken in a method of authenticating a first user according to an embodiment of the disclosed technology.

FIG. 2 shows a flow chart of steps taken in a method of authenticating a first user according to an embodiment of the disclosed technology, using a computing device as described with reference to FIG. 1. In the context of FIG. 2, the terms "first user" and "user A" are used interchangeably, and are intended to refer to the same user, which is known to be a legitimate user of the computing device.

In a first step 210 of the method, the behavior monitor gathers behavioral data for the first user, or user A, via the device. The behavioral data may originate from the touchscreen or touchpad, the gyrostatic sensor, the accelerator, the positioning sensor, or any other component of the device.

In a second step 220, which occurs during a first use of the device by the user, the gathered behavioral patterns are stored in a user profile, for example on a suitable behavioral database. In some embodiments, the behaviors are stored as part of a general profile associated with an account being accessed. In other embodiments, the behaviors are stored in a first profile or sub-profile specific to the first user.

Alternately, at step 260, which occurs during a subsequent use of the device by the first user, stored behavioral patterns are retrieved, as a user profile, from the database, based on provided user information, and the behavior monitor then compares the currently collected behavioral patterns to the stored behavioral patterns. The matching of the behavioral data to profiles in the database may be carried out using traditional statistic algorithms, or using other available algorithms like Support Vector Machine (SVM) or Bayes nets or any other suitable algorithms. Thresholds on the similarity of the profile and the provided behavioral information may be used to drive this decision.

If no match is found for the data at step 270, access to the device may be prohibited in step 280, or the user may be asked to provide additional means of authentication. Alternatively, the granularity may be adjusted to encompass a broader range of behavioral attributes until a possible match is found.

If a match is found in step 270, at step 290 the identity of user A is confirmed, and suitable authentication information is issued. Additionally, the current behavioral information is used to update the user profile associated with user A. In some cases following confirmation of the identity of user A, a private key of the user is decrypted and used for authentication against third parties, which might be carried out by signing some information or encrypting a token generating authentication information. The needed secure element keys or certificates may be generated either at production time of the secure element, or in an installation/updating phase of the secure element.

Using the authentication information, it is possible to grant access to specific features of the mobile device in step 290. The authentication information may be shared with third party applications on the device which may require security clearance. Those applications requiring security clearance may be considered "protected services" for purposes of this specification. For example, a mobile banking application may require a certain level of security clearance before granting access to certain features thereof. The access granted in step 290 may otherwise be subject to other security measures, such as, for example, the entering of a PIN, the authentication of a fingerprint, or some other biometric security measure.

Once authentication is initially confirmed, a behavioral authenticated dialogue may be started with the protected service using the authentication information provided by the behavioral monitor. Behavior pertaining to the protected service may continue to be recorded and monitored after access is granted.

If the user is rejected at step 280, information pertaining to the rejection or to reasons therefor might be shown to the user or shared with a protected service. The rejection information may then be communicated to the user of the device, informing this user that a connection to the protected service is not possible due to lack of security clearance.

Figure 3:
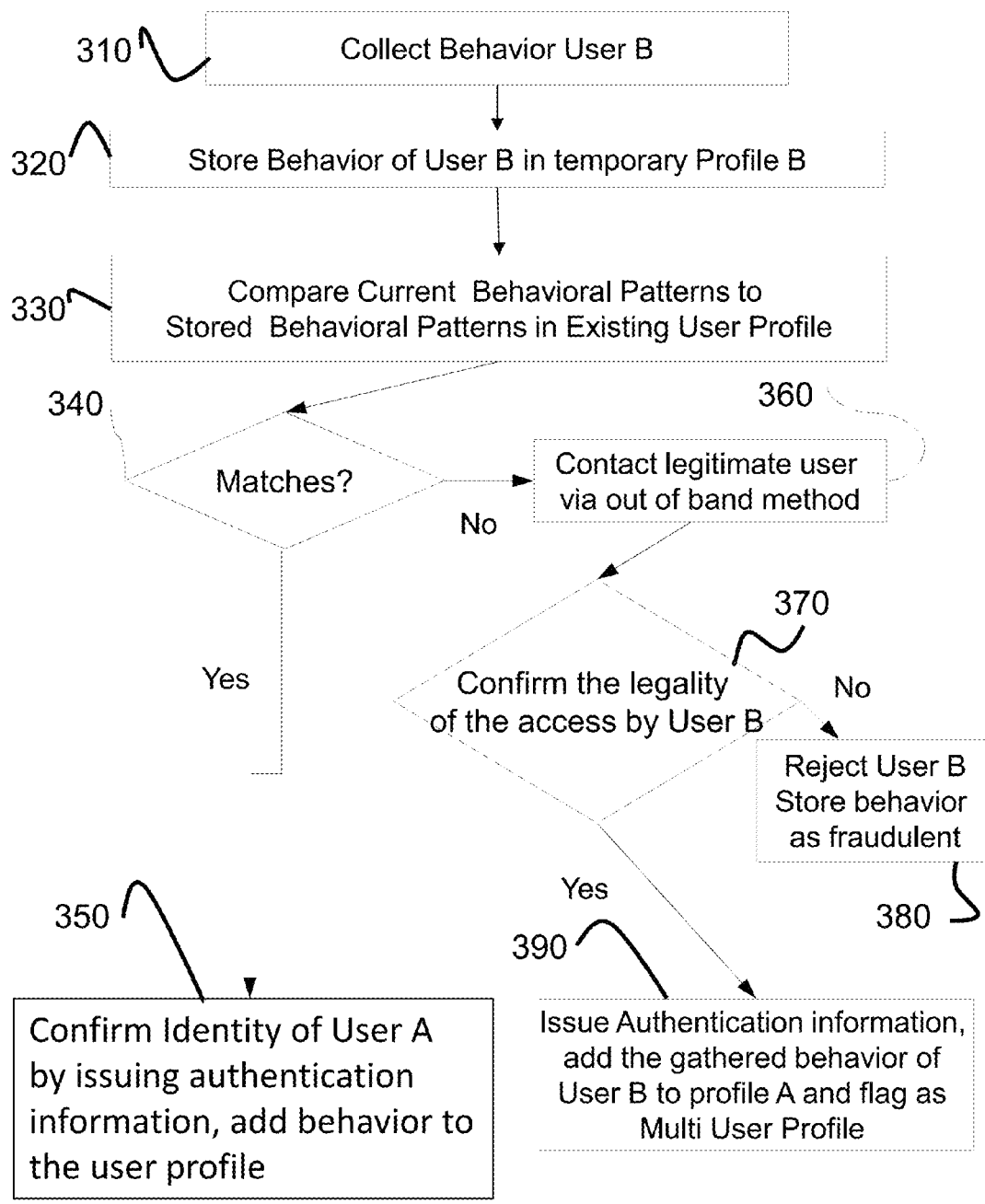
FIG. 3 shows a flow chart of steps taken in a method of authenticating a second user according to an embodiment of the disclosed technology.

FIG. 3 shows a flow chart of steps taken in a method of authenticating a second user according to an embodiment of the disclosed technology, using a computing device as described with reference to FIG. 1. In the context of FIG. 2, the terms "first user" and "user A" are used interchangeably, and are intended to refer to the same user, which is known to be a legitimate user of the computing device, and the terms "second user" and "user B" are used interchangeable, and are intended to refer to the same user, which is unknown, and may be the same user as the first user, a second legitimate user, or a fraudulent user.

In a first step 310 of the method, the behavior monitor gathers behavioral data for the second user, or user B, via a computing device used by the second user. The behavioral data may originate from the touchscreen or touchpad, the gyrostatic sensor, the accelerator, the positioning sensor, or any other component of the device.

In a second step 320, the gathered behavioral patterns are stored in a temporary user profile associated with user B, for example on a suitable behavioral database.

Additionally, at step 330, stored behavioral patterns in an existing user profile are retrieved from the database, based on provided user information, and the behavior monitor then compares the currently collected behavioral patterns to the stored behavioral. The matching of the behavioral data to profiles in the database may be carried out using traditional statistic algorithms, or using other available algorithms like Support Vector Machine (SVM) or Bayes nets or any other suitable algorithms. Thresholds on the similarity of the profile and the provided behavioral information may be used to drive this decision.

If a match is found in step 340, at step 350 it is confirmed that the unknown user B is in fact the same as the legitimate user A, and suitable authentication information is issued. Additionally, the current behavioral information is used to update the user profile associated with user A.

Alternately, if no match is found in step 340, at step 360 the legitimate user A of the device or of the account is contacted via an out of band method, and the legitimate user A is asked to confirm the legitimacy of access to the device or account by user B.

If at step 370 user A confirms that user B is an unauthorized user, and is not using the account or device legitimately, the user B is rejected at step 380, and the behavioral patterns collected during the current session are stored as fraudulent behaviors in association with account or device. Otherwise, if at step 370 user A confirms that user B is another authorized user of the account or device, suitable authentication information for user B is issued at step 390. Additionally, the current behavioral information of user B, previously stored in a temporary profile, is added to the profile associated with user A, possibly as a sub-profile, and the user profile is flagged as a multi-user profile.

In some cases following confirmation of the identity of user A or of user B, a private key of the user is decrypted and used for authentication against third parties, which might be carried out by signing some information or encrypting a token generating authentication information. The needed secure element keys or certificates may be generated either at production time of the secure element, or in an installation/updating phase of the secure element.

Using the authentication information, it is possible to grant access to specific features of the mobile device in either of steps 350 and 390. The authentication information may be shared with third party applications on the device which may require security clearance. Those applications requiring security clearance may be considered "protected services" for purposes of this specification. For example, a mobile banking application may require a certain level of security clearance before granting access to certain features thereof. The access granted in steps 350 or 390 may otherwise be subject to other security measures, such as, for example, the entering of a PIN, the authentication of a fingerprint, or some other biometric security measure.

Once authentication is initially confirmed, a behavioral authenticated dialogue may be started with the protected service using the authentication information provided by the behavioral monitor. Behavior pertaining to the protected service may continue to be recorded and monitored after access is granted.

Figure 4:
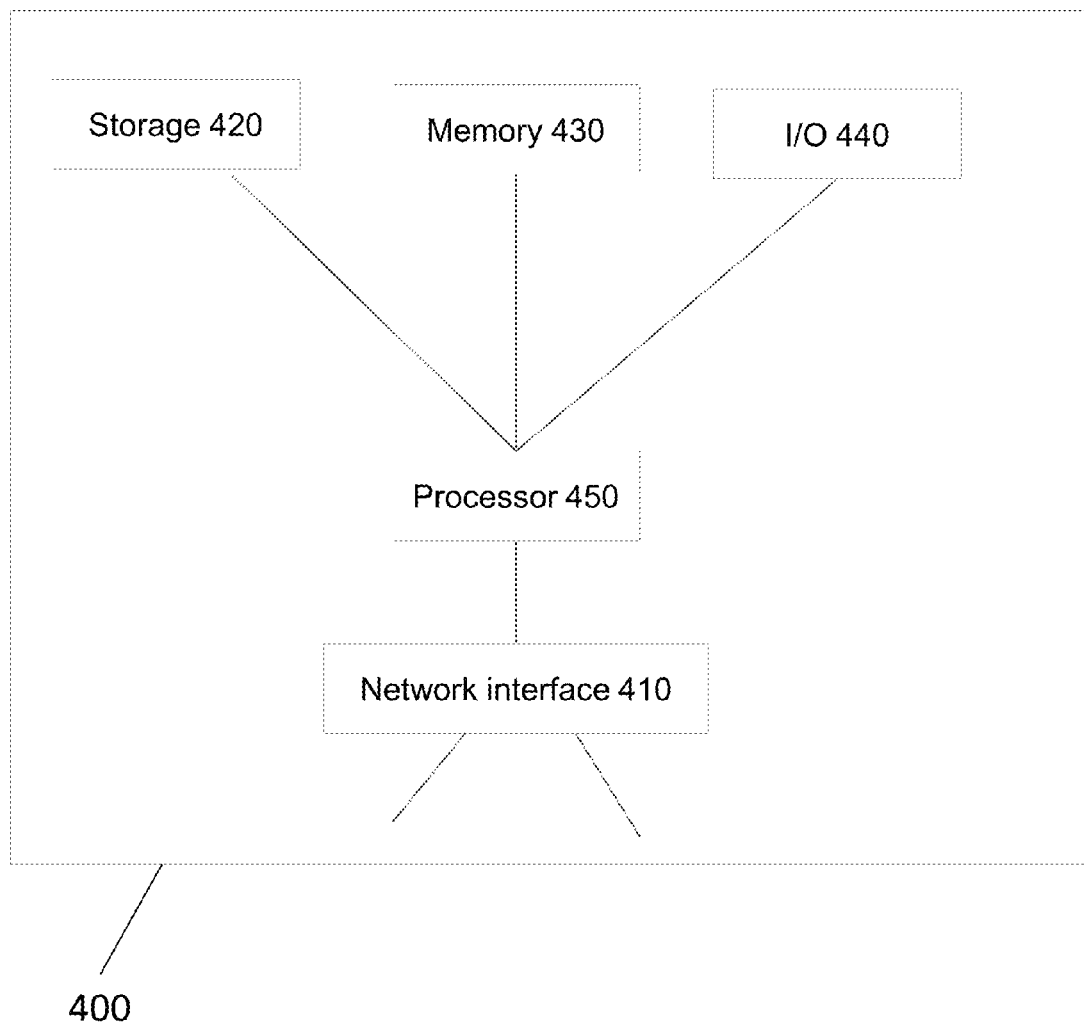
FIG. 4 shows a high level block diagram of a device that may be used to carry out the disclosed technology.

FIG. 4 shows a high level block diagram of a computing device that may be used to carry out the disclosed technology. Computing device 400 comprises a processor 450 that controls the overall operation of the device by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions.

The device 400 also includes one or a plurality of input network interfaces for communicating with other devices via a network (e.g., packet-switched data network). The device 400 further includes an electrical input interface for receiving power and data from a power source. A device 400 also includes one or more output network interfaces 410 for communicating with other devices. Device 400 also includes input/output 440, representing devices which allow for user interaction with a computing device (e.g., touch display, keyboard, fingerprint reader etc.). One skilled in the art will recognize that an implementation of an actual device will contain other components as well, and that FIG. 4 is a high level representation of some of the components of such a device for illustrative purposes. It should also be understood by one skilled in the art that the methods, systems and/or devices depicted in FIGS. 1 through 3 may be implemented on a device such as is shown in FIG. 4.

Figure 5:
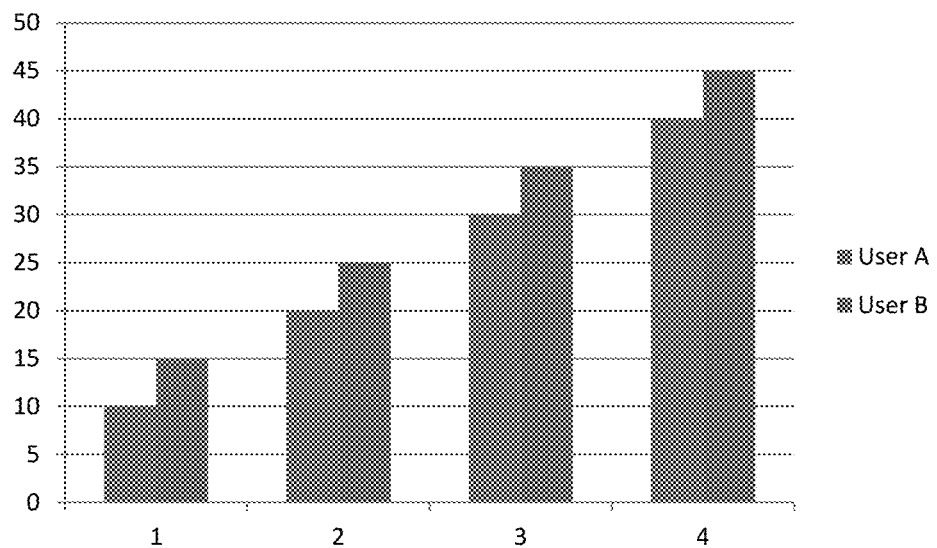
FIG. 5 shows a schematic representation of storage of behavioral data of a first user and a second user in a single user profile according to the disclosed technology.
Figure 6:
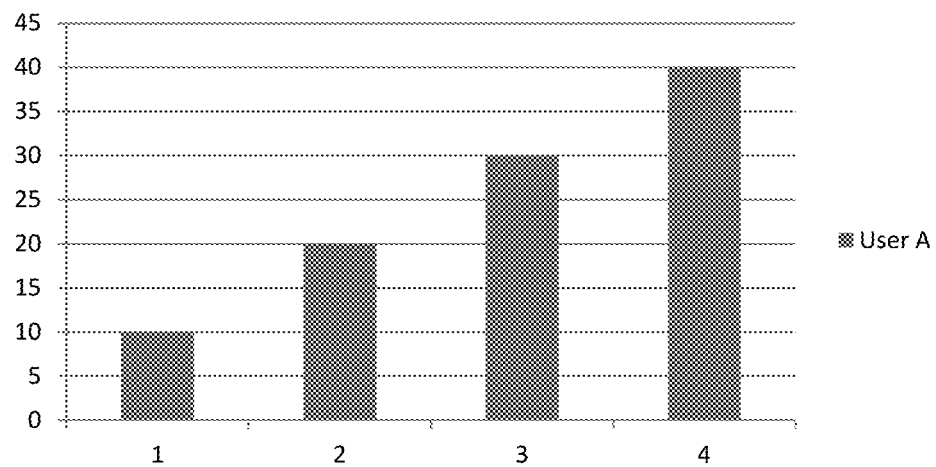
FIG. 6 shows schematic representations of storage of behavioral data of a first user and a second user in separate user profiles according to the disclosed technology.
Figure 6:
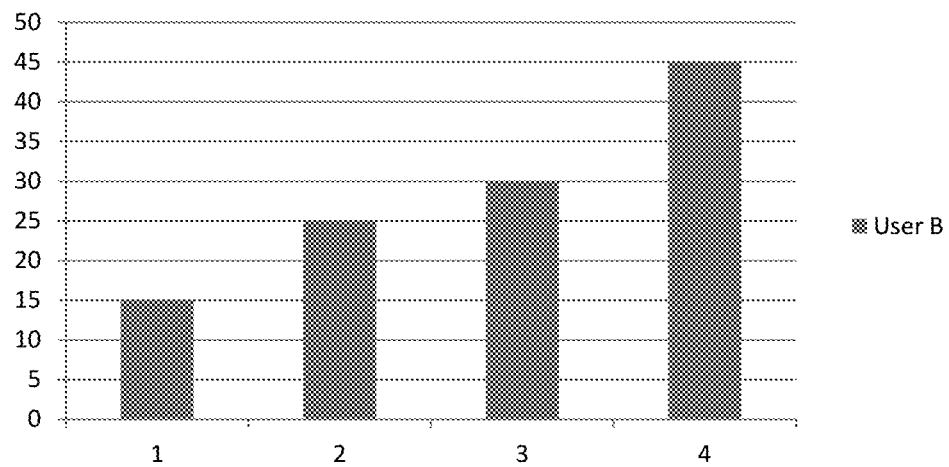

FIG. 5 shows a schematic representation of storage of behavioral data of a first user and a second user in a single user profile according to the disclosed technology. FIG. 6 shows schematic representations of storage of behavioral data of a first user and a second user in separate user profiles according to the disclosed technology. The exemplary profile shown in FIG. 5 includes stored behavioral input data of multiple users A and B for multiple modalities 1, 2, and 4, where the modalities might include key stroke behavior, the angle in which the user is holding the mobile phone and on the like.

As seen from comparison of FIGS. 5 and 6, a profile containing the stored behavior of multiple users A and B would have a wider variance than individual profiles of Users A and B in FIG. 6.

By comparing the average, deviation and/or variance of one profile with statistical values of other profiles, which are known to include multiple users or a single user, one can determine whether or not a user profile containing the behavioral input data of multiple users.

Figure 7:
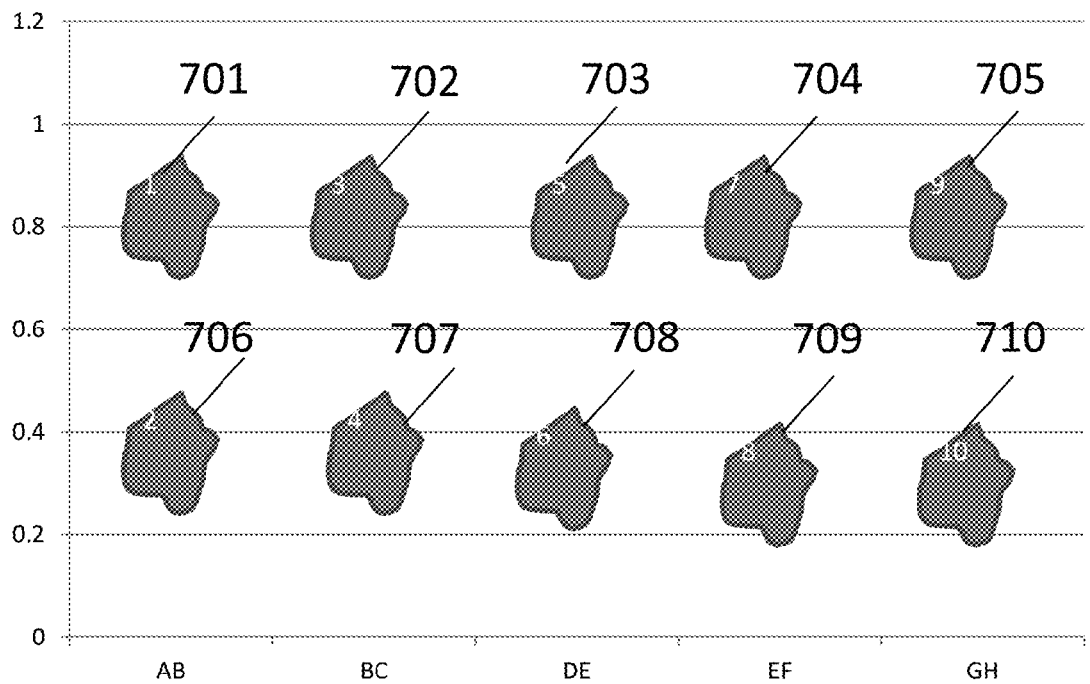
FIG. 7 shows a schematic representation of storage of data of multiple behavioral modalities of a first user and a second user in a single user profile according to the disclosed technology.

FIG. 7 shows a schematic representation of storage of data of multiple behavioral modalities of a first user and a second user in a single user profile according to the disclosed technology. As mentioned hereinabove, in some embodiments of the disclosed technology, the software program described herein can be used to discriminate users based on their behaviors and to determine whether a profile contains behavioral input data of multiple users or only of a single user. As seen, FIG. 7 shows the stored behavior of two different users for different modalities. The modalities are denoted by AB, BC, DE, and EF, FG, where AB might be the key flight time required by an individual user from releasing key A to pressing key B. BC might be the key flight time required by an individual user from releasing key B to pressing key C and so on. Statistically, users tend to require nearly identical key flight time for different pairs of keys, causing such key flight times to form cluster points of a kind, which cluster points are denoted by marks 701 to 710. As seen, cluster points 701 to 705, here labeled "group A", all have a value of approximately 0.8, whereas cluster points 706 to 710, here labeled "group B", all have a value of approximately 0.3. The closeness between the values of cluster points of different modalities within each group, and the distance between the values of cluster points of different modalities between group A and group B, is indicative of the fact that all the values in group A belong to a single user, all the values in group B belong to a single user, and that the user of group A is different from the user of group B.

It is appreciated that although FIG. 7 and the following description relate to clustering of user behaviors with respect to keystrokes, a similar analysis structure may be used for any kind of behaviourl input data or modality.

In order to determine whether the user profile includes more than one user, it must be determined whether, for each modality, there is more than one cluster point, and whether, for all modalities together, there is more than one cluster point. If there is more than one cluster point for each modality, taking the values across multiple sessions, it is likely that each cluster point corresponds to a different user, and thus it can be concluded that the profile is a multi-user profile based on the information regarding each modality.

One may also look at a plurality of sessions, to determine whether all the values for a specific modality, cluster around a single cluster point or more than one cluster point.

The following table shows behavioral input data as gathered in different sessions:

TABLE 1

|  | Modality AB | Modality BC | Modality CD | Modality EF | Modality FG |
|---|---|---|---|---|---|
| Session 1 | 1 | 3 | 5 | 7 | 9 |
| Session 2 | 2 | 4 | 6 | 8 | 10 |
| Session 3 | 1 | 3 | 5 | 8 | 9 |

TABLE 1-continued

|  | Modality AB | Modality BC | Modality CD | Modality EF | Modality FG |
|---|---|---|---|---|---|
| Session 4 | 1 | 4 | 5 | 7 | 9 |
| Session 5 | 2 | 3 | 5 | 7 | 9 |

In order to compare between sessions, and to determine how many clusters would be created, one computes the number of modalities in which the value in one session was different from the value in another session. As seen in Table 2 hereinbelow, sessions 1, 3, 4, and 5 differ from each other in no more than two modalities, whereas session 2 differs from all other sessions in at least four modalities.

TABLE 2

|  | Session 1 | Session 2 | Session 3 | Session 4 | Session 5 |
|---|---|---|---|---|---|
| Session 1 | X | 5 | 1 | 1 | 1 |
| Session 2 | 5 | X | 4 | 4 | 4 |
| Session 3 | 1 | 4 | X | 2 | 2 |
| Session 4 | 1 | 4 | 2 | X | 2 |
| Session 5 | 1 | 4 | 2 | 2 | X |

It can be concluded from FIG. 2 and the description herein that by clustering the different modalities and comparing the clustered behavioral input data session-wise, one can cluster the sessions according to their distance to other sessions. As such, one could determine which sessions are likely conducted by the same user, and which are likely conducted by another user. In the Example of Table 2, one can see that the pairwise cumulative distance of the sessions 1, 3, 4 and 5 does not exceed 2, whereas the pairwise difference of session 2 from sessions 1, 3, 4 and 5 is at least 4. As such, it is likely that session 2 was conducted by a different user than the user who conducted any one of sessions 1, 3, 4, and 5.

By using more modalities and comparing the difference of the individual sessions statistically with each other, one can determine whether the sessions originate from different users. By observing whether individual sessions or individual behavioral input data in a profile is statistically different from data corresponding to other individual sessions or individual behavioral input data, based on their distance to the other individual sessions or individual behavioral input data, one can determine whether the sessions or behavioral input data in the profile originates from one user or more users. By storing the additional statistical information about the difference of individual sessions or individual behavioral input data in the user profile, it is possible to flag a user profile as a multiuser profile.

The determine the difference between the behavior of users in sessions, statistical algorithms, as well as Kernel Methods (MS) like Support Vector Machines (SVM), Relevance Vector Machines (RVM), Bayes Nets, Fuzzy logic or other classes of pattern analysis systems may be used. Based on the identification of differences in the behavior of users in different sessions, the users and the sessions may be classified or grouped, and based on this classification it can be determined whether a user profile includes the behavioral input data of multiple users.

While the disclosed invention has been taught with specific reference to the above embodiments, a person having ordinary skill in the art will recognize that changes can be made in form and detail without departing from the spirit and the scope of the disclosed invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed invention.

The invention claimed is:

1. A method for authenticating a user for access to protected information using at least one computing device, the method comprising:
   obtaining, a behavioral input data from a first user, using at least one behavioral input device associated with a first computing device used by said first user, uploading at least a version of a portion of said behavioral input data to a behavioral server, generating a behavioral user profile using said version of said portion of said behavioral input data, and storing at said behavioral server said behavioral user profile associated with said first user known to be a legitimate user of said protected information;
   when authenticating a second user, obtaining from said second user, using a behavioral input device associated with a second computing device used by said second user, a behavioral user sample associated with said second user; uploading at least a version of a portion of said behavioral user sample to said behavioral server, and generating a temporary user profile using said version of said portion of said behavioral user sample, and storing said temporary user profile comprising said version of said portion of behavioral user sample, associated with said second user, at said behavioral server;
   at said behavioral server, comparing said temporary user profile associated with said second user to said behavioral user profile associated with said first user of said protected information;
   if said temporary user profile matches said behavioral user profile, identifying said second user as said legitimate user, enabling said second user to access said protected information, and updating at said behavioral server, said behavioral user profile associated with said first user with temporary user profile associated with said second user; and
   if said temporary user profile does not match said behavioral user profile:
   contacting, using an out of band method, said first user and receiving from said first user information regarding the legitimacy of said second user; and
   if said first user confirms that said temporary user profile associated with said second user is from a legitimate user of the protected information, adding, at said behavioral server, said temporary user profile to behavioral user profile associated with said first user and flagging said behavioral user profile as a multi user profile; wherein said multi user profile stores a plurality of behavioral modalities of said first user and said second user during a corresponding plurality of user sessions, in a single user profile; wherein said first user and said second user are different individuals.

2. The method of claim 1, wherein, if said information received from said first user denies legitimacy of said second user, said providing a response comprises:
   blocking access of said second user to said protected information; and
   storing said temporary user profiles as
   behavioral data corresponding to a fraudulent user.

3. The method of claim 1, wherein said behavioral user profile and said temporary user profile comprise at least one of:
- characteristics of tactile interaction with a touchpad;
- orientation of said behavioral input device associated with said first or second computing device used for generating said behavioral user profile or said temporary user profile, during use thereof by said first or second user, as sensed by at least one of a gyroscope and an accelerometer;
- characteristics of tactile interaction with a fingerprint scanner;
- at least one keystroke pattern;
- at least one sequence of application used by a user;
- characteristics of times of use of said first or second computing device as sensed by a clock;
- characteristics of locations at which said first or second computing device being used as sensed by at least one positioning system; and
- characteristics of network connectivity during a time said first or second computing device being used.

4. The method of claim 1, wherein said first computing device is different from said second computing device.

5. The method of claim 1, wherein said first computing device is the same as said second computing device.

6. A system for authenticating an unknown user for access to protected information based on a behavioral user profile of a known legitimate user having access to the protected information, the system comprising:
- a first computing device used by a first user comprising:
  - at least one behavioral input device;
  - a database;
  - a processor, functionally associated with said behavioral input device, said communication module, and said database;
  - obtaining, using said processor, from said behavioral input device a behavioral input data of said first user;
  - uploading, using said processor and said communication module at least a version of a portion of said behavioral input data to a behavioral server;
  - generating a behavioral user profile of said first user, using said version of said portion of said behavioral input data; and storing at said behavioral server said behavioral user profile associated with said first user, wherein said first user being said known legitimate user of said protected information;
- a second computing device used by a second user, wherein said second user being said unknown user, wherein said second computing device comprising:
- at least one behavioral input device for obtaining a behavioral user sample from said second user;
- a database;
- at least one communication module; and
- a processor, functionally associated with said behavioral input device, said communication module, and said database, said processor:
  - when authenticating said second user obtaining from said behavioral input device associated with said second computing device said behavioral user sample of said second user;
  - transmitting a version of a portion of said behavioral user sample to said behavioral server and generating therefrom a temporary user profile;
  - storing said temporary user profile comprising said version of said portion of said behavioral user sample, associated with said second user, at said behavioral server;
  - receiving from said behavioral server a result of a comparison of said temporary user profile of said second user to said behavioral user profile of said first user;
  - if said result is indicative of a match between said temporary user profile of said second user and said behavioral user profile of said first user, identifying said second user as said legitimate user, enabling said second user to access said protected information, and updating at said behavioral server, said behavioral user profile associated with said first user with said temporary user profile; and
  - if said result is indicative of said temporary user profile not matching said behavioral user profile:
    - using said at least one communication module, contacting, using an out of band method, said first user and receiving from said first user information regarding the legitimacy of said second user; and
    - if said first user confirms that the temporary user profile associated with said second user is from a legitimate user of the protected information, at behavioral server adding said temporary user profile to said behavioral user profile of said first user; and flagging said behavioral user profile of said first user as a multi user profile; wherein said multi user profile stores a plurality of behavioral modalities of said first user and said second user during a corresponding plurality of user sessions, in a single user profile; wherein said first user and said second user are different individuals.

7. The system of claim 6, wherein if said information received from said first user denies legitimacy of said second user, said processor further: blocking access of said second user to said protected information; and storing said data of said temporary user profile in said behavioral server as behavioral data corresponding to a fraudulent user.

8. The system of claim 6, wherein said behavioral input device of said first or second computing device comprises at least one of:
- a touchpad providing, as said behavioral user sample, information regarding characteristics of tactile interaction with the touchpad;
- at least one of a gyroscope and an accelerometer providing, as said behavioral user sample, information regarding orientation of said first or second computing device during use by said first or second user use;
- a keystroke sensor providing, as said behavioral user sample, information regarding at least one keystroke pattern;
- said processor providing, as said behavioral user sample, information regarding at least one sequence of application used by said first or second user;
- a clock providing, as said behavioral user sample, information regarding characteristic times of use of said first or second computing device or of at least one software application running thereon;
- a positioning device providing, as said behavioral user sample, information regarding characteristic locations of use of said first or second computing device; and
- said processor providing, as said behavioral user sample, information regarding characteristic of network connectivity during use of said first or second computing device.

* * * * *